United States Patent [19]

Turner et al.

[11] Patent Number: 5,015,132

[45] Date of Patent: May 14, 1991

[54] DIRECT TENSION INDICATOR WASHER

[75] Inventors: F. Jonathan M. Turner, Philadelphia; A. Craig Hood, Wayne, both of Pa.

[73] Assignee: J & M Turner Inc., Southampton, Pa.

[21] Appl. No.: 523,749

[22] Filed: May 15, 1990

[51] Int. Cl.⁵ ............................................. F16B 31/02
[52] U.S. Cl. ........................................ 411/10; 411/5
[58] Field of Search .................................... 411/2-5, 411/9, 10, 14; 73/761; 116/DIG. 34

[56] References Cited

U.S. PATENT DOCUMENTS 3,187,621 6/1965 Turner .................................. 411/10

FOREIGN PATENT DOCUMENTS 2403484 5/1979 France ..................................... 411/3
2107018 4/1983 United Kingdom ................. 411/10

Primary Examiner—Neill R. Wilson
Attorney, Agent, or Firm—Ratner & Prestia

[57] ABSTRACT

A pre-load indicating washer in which a plurality of protuberances, struck and partially sheared from the annular body of the washer, are pushed under load back into a corresponding of indentations in the annular body which are formed when the protuberances are formed. The walls of the protuberances and the walls of the indentations are arranged so that when the protuberances are "collapsed" back into the indentations, there is minimal frictional resistance as the walls of the protuberances slide past the walls of the indentations.

14 Claims, 2 Drawing Sheets

U.S. Patent        May 14, 1991        Sheet 1 of 2        5,015,132
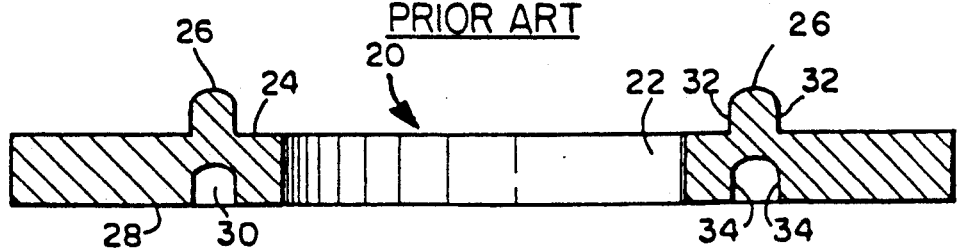
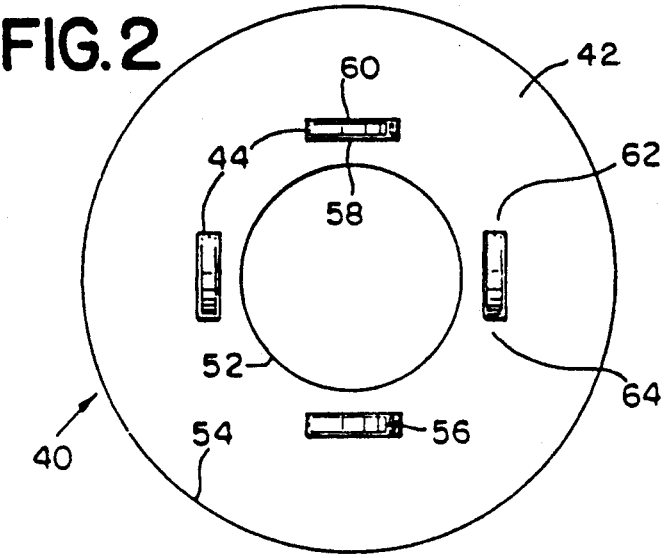
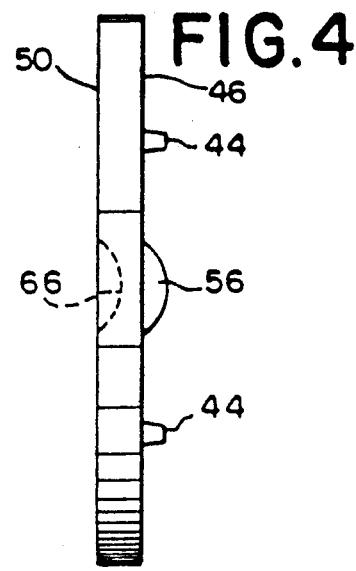
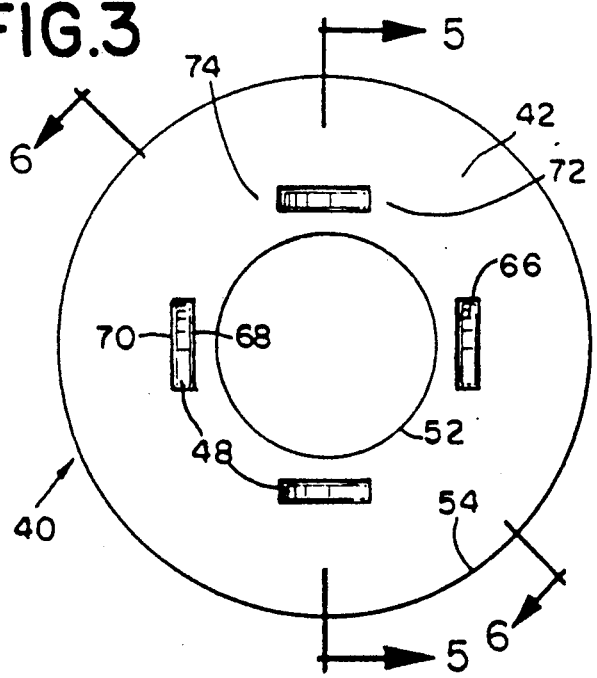
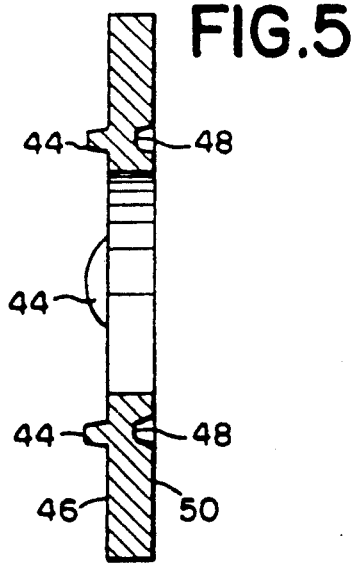
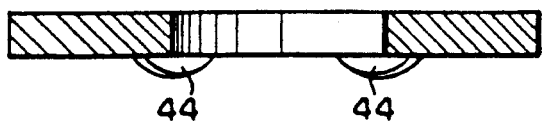

DIRECT TENSION INDICATOR WASHER

TECHNICAL FIELD

The present invention relates, in general, to the installation of fasteners and, in particular, to a pre-load indicating washer for use with a fastener which enables the desired tension of the fastener to be achieved during installation of the fastener in a joint.

BACKGROUND OF THE INVENTION

It is well known to those skilled in the art that the most accurate way to install tension into fasteners in a joint is to control tightening by developing an indication of the tension in the fastener either directly from the fastener or another component with the fastener. Fastener installation based on torque control can result in wide variations in the tension in the fastener because of variations in fastener lubricity, burrs on the thread of threaded fasteners, and variations in the friction at the surface of the joint component against which the bearing surface of a threaded fastener bears.

U.S. Pat. No. 3,187,621 is directed to a pre-load indicating washer adapted for use with a threaded fastener and intended to develop an indication of proper tensioning of the fastener. This pre-load indicating washer has a plurality of protuberances which are struck and partially sheared from an annular body to leave indentations in the annular body. With this pre-load indicating washer in a joint, the protuberances are pushed back into the indentations in the annular body as the joint is tightened and tightening is stopped when the protuberances have been "collapsed" back into the indentations in the annular body a prescribed amount. This condition, typically, is sensed by a "feeler" gage inserted into a gap in the joint. A shortcoming of the particular pre-load indicating washer disclosed in U.S. Pat. No. 3,187,621 will be considered hereinafter in connection with FIG. 1.

SUMMARY OF THE INVENTION

A pre-load indicating washer, constructed in accordance with the present invention, includes an annular body and a plurality of protuberances integral with the annular body struck and partially sheared from the annular body to project from a first face of the annular body and leave a corresponding plurality of indentations in a second face of the annular body opposite from the first face. Each of the protuberances is defined by (a) a pair of side walls extending away from the first face of the annular body and (b) an outer surface extending between the pair of outer side walls and between two spaced regions of the first face of the annular body. Each of the indentations is defined by (a) a pair of inner side walls extending through the annular body from the second face of the annular body and from which a pair of the outer side walls of one of the protuberances has been sheared and (b) an inner surface extending between the pair of inner side walls and between two spaced regions of the second face of the annular body. Each outer side wall of a protuberance extends along a line which is not in alignment with the line along which the inner side wall of the indentation from which the outer side wall has been sheared extends and each indentation has a width at the second face of the annular body which is no less than the width of its associated protuberance at the first face of the annular body.

BRIEF DESCRIPTION OF THE DRAWINGS

FIG. 1 is a sectional view of a prior art pre-load indicating washer.

FIG. 2 is a plan view of one face of a pre-load indicating washer constructed in accordance with the present invention.

FIG. 3 is a plan view of the opposite face of the FIG. 2 pre-load indicating washer.

FIG. 4 is a elevation view of the FIGS. 2 and 3 pre-load indicating washer.

FIG. 5 is a sectional view taken along line 5—5 of FIG. 3.

FIG. 6 is a sectional view taken along line 6—6 of FIG. 3.

DESCRIPTION OF THE PRIOR ART

Figure 7:
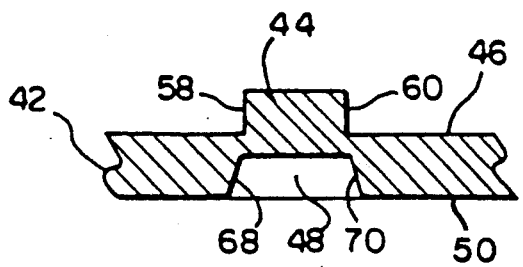
FIGS. 7, 8 and 9 show, on an enlarged scale, three profiles of different protuberances/indentations arrangements which can be used in accordance with the present invention.

U.S. Pat. No. 3,187,621 is incorporated by reference as if its entire contents were fully set forth herein. FIG. 1 of this application, identified as "PRIOR ART," corresponds to FIG. 4, of U.S. Pat. No. 3,187,621, except that it is presented, in this application, on a somewhat enlarged scale.

Referring to FIG. 1, the pre-load indicating washer 20 comprises an annular body 22 which has on a first face 24 a plurality of protuberances 26 which are formed by displacement of metal as a result of indenting a second face 28 to partially shear the metal and form a corresponding plurality of indentations 30 in face 28. Protuberances 26 and indentations 30 have outer side walls 32 and inner side walls 34, respectively, which are substantially in alignment. As a result, when this pre-load indicating washer is used in a joint and protuberances 26 are "collapsed" back into indentations 30 in annular body 22 as the joint is tightened, the amount of force required to "collapse" the protuberances into their indentations is affected by the frictional resistance as outer side walls 32 of the protuberances slide along inner side walls 34 of the indentations. Because this frictional resistance can vary from one washer to the next and even between the protuberance/indentation combinations of the same washer, the ease of "collapse" of the protuberances can vary, depending upon surface lubricity, and, on occasion, has required substantial internal process modifications, including special heat treatments, to maintain the product at its published level of quality. Not only does the present invention largely overcome the frictional problem, but in doing so, creates a substantially reduced statistical deviation in product performance.

DETAILED DESCRIPTION OF THE INVENTION

Referring to FIGS. 2 through 6, a pre-load indicating washer 40, constructed in accordance with the present invention, includes an annular body 42 and a plurality of protuberances 44 integral with the annular body struck and partially sheared from the annular body to project from a first face 46 of the annular body and leave a corresponding plurality of indentations 48 in a second face 50 of the annular body opposite from face 46. For the embodiment of the present invention illustrated in FIGS. 2 through 6, protuberances 44 are spaced circumferentially at regular intervals between the circular inner periphery 52 of annular body 42 and the circular outer periphery 54 of the annular body. Protuberances 44 are substantially oblong in outline, each with its greater length extending in the direction of a line tangential to a circle around and concentric with circular inner periphery 52 of annular body 42. Each protuberance 44 has a convex outer surface 56 extending between a pair of outer side walls 58 and 60 and extending arcuately in the direction of its greater length between two spaced regions 62 and 64 of face 46 of annular body 42. Side walls 58 and 60 of protuberances 44 extend substantially tangential to circles concentric with circular inner periphery 52 of annular body 42. Each indentation 48 has a concave inner surface 66 extending between a pair of inner side walls 68 and 70 and extending arcuately in the direction of its greater length between two spaced regions 72 and 74 of face 50 of annular body 42. Concave inner surfaces 66 of indentations 48 are substantially complementary to their associated convex outer surfaces 56 of protuberances 44.

Figure 8:
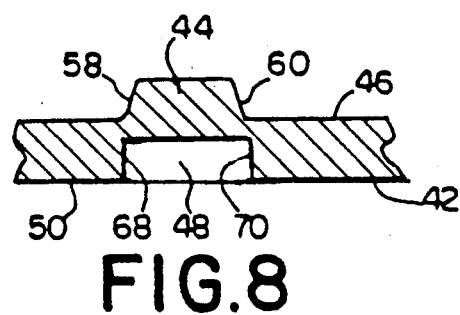
Figure 9:
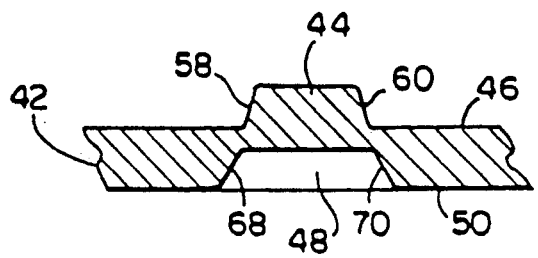

Up to this point in the description of a pre-load indicating washer, constructed in accordance with the present invention, this washer is generally similar to the one described and illustrated in U.S. Pat. No. 3,187,621. FIGS. 7 through 9, which are sectional views taken through a protuberance/indentation combination, show three embodiments of the present invention and indicate how the present invention differs from the pre-load indicating washer of U.S. Pat. No. 3,187,621. In each of these embodiments of the present invention, the outer side wall of the protuberance extends along a line which is not in alignment with the line along which the inner side wall of the indentation from which the outer side wall has been sheared extends and each indentation has a greater width at the second face of the annular body than the width of its associated protuberance at the first face of the annular body. As a result, as the protuberance is "collapsed" back into its associated indentation in the annular body of the pre-load indicating washer, there is only a limited effect of friction as the outer side walls of the protuberance slide past the leading edges of the inner walls of the indentation.

In FIG. 7, outer side walls 58 and 60 of protuberance 44 are perpendicular to face 46 of annular body 42, while inner side walls 68 and 70 of indentation 48 are at an angle to face 50 of the annular body to form a tapered indentation having an included angle between the inner side walls which is less than 90 degrees. As protuberance 44 is "collapsed" into indentation 48, frictional contact between the outer side walls of the protuberance and the inner side walls of the indentation is limited to the leading edges of the inner side walls of the indentation because the inner side walls of the indentation angle away from the paths of movement of the outer side walls of the protuberance. Protuberance 44 and indentation 48 in the FIG. 7 embodiment of the present invention can be formed by a tapered punch and a straight bore die.

In FIG. 8, outer side walls 58 and 60 of protuberance 44 are at an angle to face 46 of annular body 42 to form a tapered protuberance having an included angle between the outer side walls which is less than 90 degrees, while inner side walls 68 and 70 of indentation 48 are perpendicular to face 50 of the annular body. As protuberance 44 is "collapsed" into indentation 48, frictional contact between the outer side walls of the protuberance and the inner side walls of the indentation is limited to the leading edges of the inner side walls of the indentation because the outer side walls of the protuberance angle away from the inner side walls of the indentation as the protuberance moves into the indentation. Protuberance 44 and indentation 48 in the FIG. 8 embodiment of the present invention can be formed by a tapered bore die and a straight punch.

In FIG. 9, outer side walls 58 and 60 of protuberance 44 are at a first angle to face 46 of annular body 42 to form a tapered protuberance having an included angle between the outer side walls which is less than 90 degrees, while inner side walls 68 and 70 of indentation 48 are at a second angle to face 50 of the annular body to form a tapered indentation having an included angle between the inner side walls which is also less than 90 degrees. As protuberance 44 is "collapsed" into indentation 48, frictional contact between the outer side walls of the protuberance and the inner side walls of the indentation is limited to the leading edges of the inner side walls of the indentation because the inner side walls of the indentation angle away from the paths of movement of the outer side walls of the protuberance. Protuberance 44 and indentation 48 in the FIG. 9 embodiment of the present invention can be formed by a tapered punch and a tapered bore die.

Pre-load indicating washer 40 preferably is made from steel and has been heat treated after formation of the protuberances and indentations. It will be apparent that other materials can be used and that heat treatment is not always required to develop the desired properties.

Figure 10:
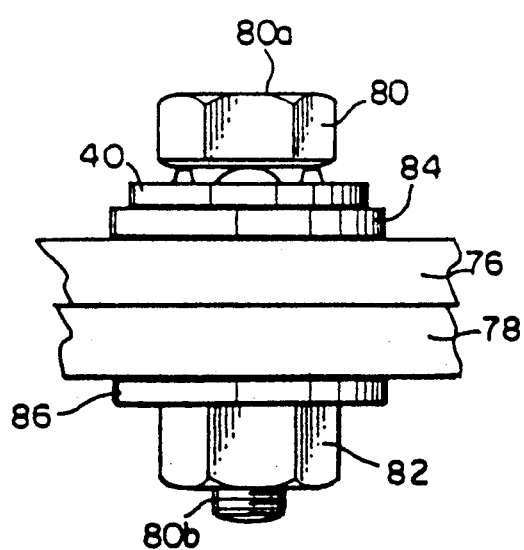
FIG. 10 is an elevation view of a joint assembly in which a pre-load indicating washer, constructed in accordance with the present invention, can be used prior to tightening.
Figure 11:
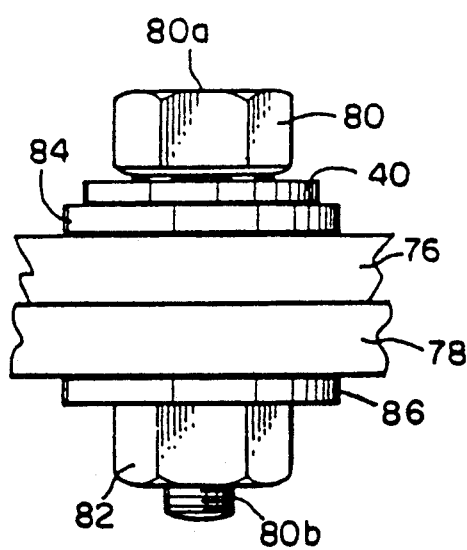
FIG. 11 is similar to FIG. 10 but shows the joint assembly after tightening.

The use of a pre-load indicating washer, constructed in accordance with the present invention, is illustrated in FIGS. 10 and 11. A joint assembly, comprising a pair of joint members 76 and 78, an externally threaded member in the form of a bolt 80, an internally threaded member in the form of a nut 82, and a pair of standard washers 84 and 86, is assembled with the proper tension in the bolt by use of pre-load indicating washer 40. The pre-load indicating washer is positioned somewhere between head 80a of bolt 80 and nut 82 which is in threaded engagement with shank 80b of the bolt so that the pre-load indicating washer is subjected to the clamping load between the bolt and the nut as the joint assembly is tightened. For the particular arrangement illustrated in FIGS. 10 and 11, pre-load indicating washer 40 is positioned against head 80a of bolt 80 with the underside bearing surface of the bolt head bearing against the tops of the protuberances of pre-load indicating washer 40. The joint is tightened either by driving bolt 80 or nut 82 with the protuberances isolated, for example by a washer, from the component being turned. For the arrangement shown in FIGS. 10 and 11, nut 82 is turned. As tightening proceeds, the protuberances of the pre-load indicating washer collapse into their associated indentations and the gap between the top surface of pre-load indicating washer 40 and the underside bearing surface of the bolt head is reduced. When this gap has been reduced a prescribed amount, as measured by a "feeler" gage, tightening is stopped because the gap represents proper tensioning of bolt 80. This is so because the number and size of the protuberances have been selected with respect to the compressive force applied by the nut and the bolt, so that the protuberances will plastically deform into the annular body when the compressive force applied to the pre-load indicating washer has reached the desired tension in the bolt.

While in the forgoing there have been described preferred embodiments of the present invention, it should be obvious to those skilled in the art that various modifications and changes can be made without departing from the true spirit and scope of the invention.

What is claimed:

1. A pre-load indicating washer comprising an annular body and a plurality of protuberances integral with said annular body struck and partially sheared from said annular body to project from a first face of said annular body and leave a corresponding plurality of indentations in a second face of said annular body opposite from said first face, each of said protuberances defined by:
   (a) a pair of outer side walls extending away from said first face of said annular body, and
   (b) an outer surface extending between said pair of outer side walls and between two spaced regions of said first face of said annular body, and
each of said indentations defined by:
   (a) a pair of inner side walls extending through said annular body from said second face of said annular body and from which a pair of outer side walls of one of said protuberances has been sheared, and
   (b) an inner surface extending between said pair of inner side walls and between two spaced regions of said second face of said annular body
each of said outer side walls of said protuberances extending along a line not in alignment with the line along which the inner side wall of an indentation from which said outer side wall has been sheared extends and each of said indentations having a width at said second face of said annular body no less than the width of its associated protuberance at said first face of said annular body.

2. A pre-load indicating washer according to claim 1 wherein said protuberances are oblong in outline and are at circumferentially spaced intervals.

3. A pre-load indicating washer according to claim 2 wherein said outer side walls of said protuberances extend substantially tangential to circles concentric with a circular inner periphery of said annular body.

4. A pre-load indicating washer comprising an annular body and a plurality of protuberances integral with said annular body struck and partially sheared from said annular body to project from a first face of said annular body and leave a corresponding plurality of indentations in a second face of said annular body opposite from said first face, each of said protuberances defined by:
   (a) a pair of outer side walls extending away from said first face of said annular body, and
   (b) an outer surface extending between said pair of outer side walls and between two spaced regions of said first face of said annular body, and
each of said indentations defined by:
   (a) a pair of inner side walls extending through said annular body from second face of said annular body and from which a pair of outer side walls of one of said protuberances has been sheared, and
   (b) an inner surface extending between said pair of inner side walls and between two spaced regions of said second face of said annular body, and each of said outer side walls of said protuberances extending at an angle relative to the inner side wall of an indentation from which said outer side wall has been sheared and each of said indentations having a width at said second face of said annular body no less than the width of its associated protuberance at said first face of said annular body.

5. A pre-load indicating washer according to claim 4 wherein each of said outer side walls of said protuberances extends at an angle to said first face of said annular body to form tapered protuberances having an included angle between said outer side walls which is less than 90 degrees and each of said inner side walls of said indentations extends perpendicular to said second face of said annular body.

6. A pre-load indicating washer according to claim 4 wherein each of said inner side walls of said indentations extends at an angle to said first face of said annular body to form tapered indentations having an included angle between said inner side walls which is less than 90 degrees and each of said outer side walls of said protuberances extends perpendicular to said first face of said annular body.

7. A pre-load indicating washer according to claim 4 wherein each of said outer side walls of said protuberances extends at a first angle to said first face of said annular body to form a tapered protuberance having an included angle between said outer side walls which is less than 90 degrees and each of said inner side walls of said indentations extends, at a second angle to said second face of said annular body to form a tapered indentation having an included angle between said inner side walls which is less than 90 degrees.

8. A joint assembly comprising:
   at least one joint member;
   an externally threaded member extending through said joint member;
   an internally threaded member into which one end of said externally threaded member is turned;
   and a pre-load indicating washer disposed between said internally threaded member and an opposite end of said externally threaded member and comprising an annular body and a plurality of protuberances integral with said annular body struck and partially sheared from said annular body to project from a first face of said annular body and leave a corresponding plurality of indentations in a second face of said annular body opposite from said first face, each of said protuberances defined by:
   (a) a pair of outer side walls extending away from said first face of said annular body, and
   (b) an outer surface extending between said pair of outer side walls and between two spaced regions of said first face of said annular body,
   each of said recesses defined by:
   (a) a pair of inner side walls extending through said annular body from said second face of said annular body and from which a pair of outer side walls of one of said protuberances has been sheared, and
   (b) an inner surface extending between said pair of inner side walls and between two spaced regions of said second face of said annular body, and
   each of said outer side walls of said protuberances extending along a line not in alignment with the line along which the inner side wall of an indentation from which said outer side wall has been sheared extends and each of said indentations having a width at said second face of said annular body no less than the width of its associated protuberance at said first face of said annular body.

9. A joint assembly according to claim 8 wherein said joint assembly includes a pair of joint members, said externally threaded member is a bolt extending through said pair of joint members and having a head and a threaded shank, and said internally threaded member is a nut in threaded engagement with said threaded shank of said bolt.

10. A joint assembly according to claim 9 wherein said pre-load indicating washer is positioned against said head of said bolt with said protuberances bearing against said head of said bolt.

11. A joint assembly comprising:
   at least one joint member;
   an externally threaded member extending through said joint member;
   an internally threaded member into which one end of said externally threaded member is turned;
   and a pre-load indicating washer disposed between said internally threaded member and an opposite end of said externally threaded member and comprising an annular body and a plurality of protuberances integral with said annular body struck and partially sheared from said annular body to project from a first face of said annular body and leave a corresponding plurality of indentations in a second face of said annular body opposite from said first face, each of said protuberances defined by:
   (a) a pair of outer side walls extending away from said first face of said annular body, and
   (b) an outer surface extending between said pair of outer side walls and between two spaced regions of said first face of said annular body,
   each of said recesses defined by:
   (a) a pair of inner side walls extending through said annular body from said second face of said annular body and from which a pair of outer side walls of one of said protuberances has been sheared, and
   (b) an inner surface extending between said pair of inner side walls and between two spaced regions of said second face of said annular body, and
   each of said outer side walls of said protuberances extending at an angle relative to the inner side wall of an indentation from which said outer side wall has been sheared and each of said indentations having a width at said second face of said annular body no less than the width of its associated protuberance at said first face of said annular body.

12. A joint assembly according to claim 11 wherein each of said outer side walls of said protuberances extends at an angle to said first face of said annular body to form tapered protuberances having an included angle between said outer side walls which is less than 90 degrees and each of said inner side walls of said indentations extends perpendicular to said second face of said annular body.

13. A joint assembly according to claim 11 wherein each of said inner side walls of said indentations extends at an angle to said first face of said annular body to form tapered indentations having an included angle between said inner side walls which is less than 90 degrees and each of said outer side walls of said protuberances extends perpendicular to said first face of said annular body.

14. A joint assembly according to claim 11 wherein each of said outer side walls of said protuberances extends at a first angle to said first face of said annular body to form a tapered protuberance having an included angle between said outer side walls which is less than 90 degrees and each of said inner side walls of said indentations extends at a second angle to said second face of said annular body to form a tapered indentation having an included angle between said inner side walls which is less than 90 degrees.

* * * * *